(12) United States Patent
Dickson et al.

(10) Patent No.: US 6,521,310 B1
(45) Date of Patent: Feb. 18, 2003

(54) CLING FILM

(76) Inventors: John P. Dickson, 3 Soi 8, Soon Vijai, Bangkok (TH), 10310; Gordon A. Martin, GPO Box 250, Bangkok (TH), 10500

( * ) Notice: Subject to any disclaimer, the term of this patent is extended or adjusted under 35 U.S.C. 154(b) by 71 days.

(21) Appl. No.: 09/619,602

(22) Filed: Jul. 19, 2000

(30) Foreign Application Priority Data

May 15, 2000 (GB) .............................................. 0011700

(51) Int. Cl.$^7$ .............................................. B65D 65/00
(52) U.S. Cl. ..................... 428/40.1; 229/87.01; 283/81; 428/41.7; 428/41.8; 428/43; 428/77; 428/78; 428/192; 428/194; 428/537.5; 428/906

(58) Field of Search ................................ 428/40.1, 41.7, 428/41.8, 43, 77, 78, 192, 194, 906, 537.5; 229/87.01; 283/81

(56) References Cited

U.S. PATENT DOCUMENTS

| | | | | |
|---|---|---|---|---|
| 4,424,926 A | * | 1/1984 | Gatward ....................... | 225/26 |
| 5,403,025 A | * | 4/1995 | Shanley ....................... | 283/81 |
| 6,171,681 B1 | * | 1/2001 | Mascarenhas ............... | 428/141 |
| 6,284,339 B1 | * | 9/2001 | Floegel ........................ | 428/43 |

* cited by examiner

Primary Examiner—Nasser Ahmad
(74) Attorney, Agent, or Firm—Clifford A. Poff

(57) ABSTRACT

A wrapping product comprising a laminate of a layer of cling film and a layer of spacing material, the cling film and the spacing material being substantially non adherent to one another.

13 Claims, 1 Drawing Sheet

CLING FILM

CROSS REFERENCE TO RELATED APPLICATIONS

Not applicable.

BACKGROUND OF THE INVENTION

Field of the Invention

The present invention relates to improvements in or relating to cling film, and in particular to the dispensing of cling film for domestic and catering use.

Cling film has been available for domestic use for many years, and is widely used for wrapping foodstuffs before the foodstuffs are placed in a refrigerator or packed in a lunch box. An important and useful property of cling film is that it adheres both to itself and to other non adherent surfaces without the addition of an adhesive. This property allows a user to wrap cling film around an object (for instance some food on a plate) and to form without difficulty an airtight seal there around. In order to be useful for wrapping or covering arbitrarily shaped objects, cling film is necessarily dimensionally unstable, and the gentlest of forces is sufficient to cause a length of cling film to collapse on itself. Typically, cling film is manufactured from polyethylene or polyvinyl chloride. The resultant film has a thickness in the order of 6 to 16 μm.

A length of cling film is provided wound around a spool to form a roll, which is typically provided in an elongate cardboard box. In use, cling film is required in the form of a sheet. In order to obtain such a sheet, the free end of the roll is grasped and pulled, causing the film to unroll from the roll. Once the desired length of film has been unrolled, this length is severed from the remainder of the roll as a delicate sheet, often by means of a cutting edge provided integrally with the cardboard box.

However, this mode of use of cling film presents difficulties. A user must learn the process of extracting sheets from the roll and, as will be discussed below, this process can be far from straightforward.

Cling film is transparent, to allow a user to identify an object that is wrapped therein without the need to unwrap the object. However, this transparency can make it difficult to locate the free end of the roll, and time can be wasted searching for the free end.

A further difficulty arises from the elastic nature of cling film. Since the cling film stretches as a length is unrolled from the roll, the user has to compensate for this stretching (and the subsequent contraction) and attempt to judge how much cling film needs to be unrolled from the roll to produce the desired length of cling film after the cutting of this length from the main roll.

A fair amount of dexterity is required to stretch a length of film over the cutting edge provided on the box and pull the length in such a way as to sever it from the main roll. This act requires the user to hold the free end of the cling film in one hand and the box in the other, and it is a common occurrence for the elastic nature of the cling film to cause the severed length to wrap itself around the user's hand as it springs away from the box. Cling film is also self-adherent in that it readily attaches to itself, and the process of extracting a length from the main roll can cause regions of the cling film to adhere to other regions of the cling film. This situation is difficult to remedy, and often the severed length of cling film must be discarded and a new length obtained from the main roll.

SUMMARY

It is an object of the present invention to provide a method and device for dispensing cling film that seeks to alleviate some or all of the above difficulties.

Accordingly, one aspect of the present invention provides a wrapping product comprising a laminate of a layer of cling film and a layer of spacing material, the cling film and the spacing material being substantially non adherent to one another.

Preferably, the cling film is polyethylene or polyvinyl chloride.

Conveniently, the spacing material is a paper or plastic material.

Advantageously, the paper material is single-ply tissue paper.

Preferably, means are provided to removably attach the layer of cling film to the layer of spacing material.

Conveniently, the layer of cling film is removably attached to the layer of spacing material by a weak adhesive between the layer of cling film and the layer of spacing material.

Alternatively, the layer of cling film is removably attached to the layer of spacing material by one or more spot-welds or glue sports.

Preferably, the layer of spacing material is wider than the layer of cling film.

Another aspect of the present invention provides a sheet of a cling product as described above.

Conveniently, the layer of spacing material is longer then the layer of cling film.

Another aspect of the present invention provides a block comprising a plurality of sheets of a cling product stacked together.

Advantageously, the block is contained in a package.

Preferably, the package is a flexible package.

Alternatively, the package is a rigid package.

Another aspect of the present invention provides a roll comprising a length of wrapping product wound around a spool.

Conveniently, the length of wrapping product is provided with a plurality of lines of perforations at predetermined locations there along.

Advantageously, the roll is contained in a package.

Preferably, the package comprises an elongate box.

Conveniently, the elongate box is provided with a cutting edge.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Figure 1:
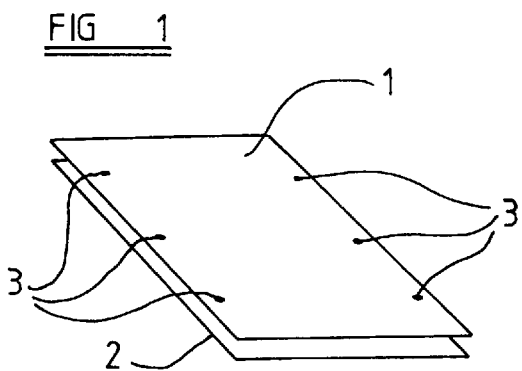
FIG. 1 shows a sheet of wrapping product embodying the present invention.

Referring to FIG. 1, a sheet of wrapping product embodying the present invention is shown. Such a wrapping product, in its finished state, comprises a laminate of a layer of cling film 1 and a layer of spacing material 2. An essential property of the spacing material 2 is that the material does not substantially attach to the cling film 1. Materials which have this property are readily known and available to persons of ordinary skill in this technical field. The spacing material 2 is preferably composed of a single-ply tissue paper. The cling film 1 is conventional cling film manufactured from polyethylene or polyvinyl chloride. The cling film 1 is self-adherent in that it readily attaches to itself.

In order to provide adjacent layers of cling film 1 and spacing material 2, first and second rollers having webs of cling film 1 and spacing material 2 respectively wrapped there around are provided. The rollers are rotatable to dispense continuous webs of cling film 1 and spacing material 2. The second roller is rotated to dispense a continuous web of spacing material 2 which is cut into sheets of a predetermined length. A number of small spots of glue 3 are applied to each of these sheets. The first roller is rotated to dispense a web of cling film 1, which is also cut into sheets of a predetermined length. Preferably, these sheets are of similar or identical size to the sheets of spacing material 2.

The rollers and the cutting equipment are arranged so that each of the sheets of cling film 1 settles onto a sheet of spacing material 2, and is weakly adhered thereto by means of the spots of glue 3 on the surface thereof. A gentle pressure is then applied to the top surface of each sheet of cling film 1, to ensure adhesion to the respective sheet of spacing material 2.

Figure 2:
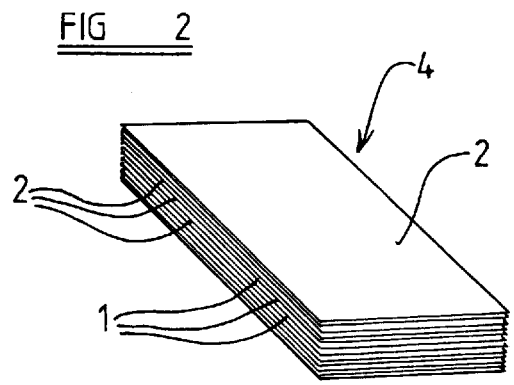
FIG. 2 shows a block embodying the present invention.

FIG. 2 shows a block 4 comprising numerous sheets of equal size, alternate ones of these sheets being sheets of cling film 1, the remaining sheets being sheets of spacing material 2. As shown in FIG. 1, each sheet of cling film 1 is joined to an adjacent sheet of spacing material 2 within the block by spot-welding or spot-glueing at several points 3 within the perimeter of each sheet of cling film 1. Thus, each sheet of cling film 1 is removably attached to a sheet of spacing material 2.

Preferably, each sheet of spacing material 2 is provided above the sheet of cling film 1 to which it is removably attached. In use, when a sheet of cling film 1 is required, the topmost sheet of spacing material 2 is simply removed from the block 4. Because a sheet of cling film 1 is attached to the sheet of spacing material 2, the sheets are removed from the block 4 simultaneously as a sheet of wrapping product. No problems are encountered regarding the adhesion of the required sheet of cling film 1 to the sheet of cling film 1 immediately there below because the spacing material 2 prevents the two sheets of cling film 1 from adhering to one another.

In this embodiment, the selected sheet of wrapping product is more robust that a sheet of cling film 1 alone, and may be transferred from the block 4 to an object to be wrapped with less possibility of folding and adhering to itself in transit. Accordingly, the user may wrap the sheet of wrapping product around the object, and hence will be applying a wrapping pressure to the cling film 1 through the sheet of spacing material 2. The cling film 1, will not adhere to the user's hand during this process, as only the spacing material 2 will be in contact therewith. Once the user is satisfied that the object is adequately wrapped in the cling film 1, the sheet of spacing material 2 is detached from the sheet of cling film 1 leaving the object wrapped in the cling film 1. It will be appreciated that, not only does this mode of use eliminate the possibility of the user's hand adhering to the cling film 1, but this method may be performed using only one hand. The sheet of spacing material 2, which is preferably a sheet of single-ply tissue paper, may be put to immediate use in the kitchen, for instance as a kitchen wipe. Alternatively, the sheet of tissue paper may be stored for later use.

Figure 3:
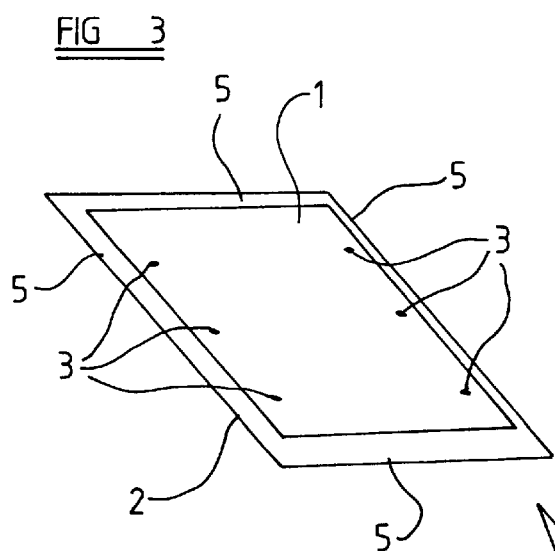
FIG. 3 shows another sheet of wrapping product embodying the present invention.

In a preferred embodiment, the sheets of spacing material 2 are slightly wider and longer than the sheets of cling film 1 such that each sheet of cling film 1 has a border 5 of spacing material 2 there around as shown in FIG. 3. This disparity in size eliminates the possibility of the edges of the sheets of cling film 1 protruding over the edges of the spacing material 2 and adhering to one another, thus making it awkward to remove an individual sheet of cling film 1.

In order to achieve this, the width of the web of spacing material 2 that is fed from the second roller is slightly wider than the width of the cling film 1 that is fed from the first roller. Further, the sheets cut from the web of spacing material 2 fed from the second roller are slightly long than the sheets of cling film 1 cut from the web dispensed from the first roller.

It should be noted that the sheet of cling film 1 settles onto the respective sheet of spacing material 2 such that an edge of spacing material 2 protrudes from each side of the sheet of cling film 1.

It will be appreciated that the resultant block 4 of sheets comprises sheets of cling film 1 which are prevented from adhering to one another by the interleaved sheets of spacing material 2 and are also prevented from attachment to one another by their edges because of the protruding border 5 of spacing material 2 around each sheet of cling film 1.

These features make embodiments of the present invention particularly useful for people who are only able to use one hand in the process of dispensing cling film 1, for example, people with certain disabilities.

The block 4 may be packaged in a flexible, semi-rigid or rigid package to prevent damage thereto while the block is in transit.

Figure 4:
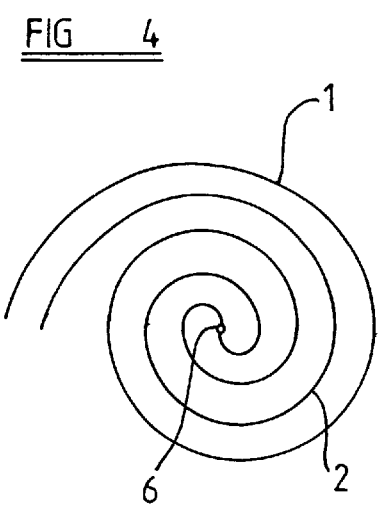
FIG. 4 shows a roll embodying the present invention.

FIG. 4 shows an alternative embodiment of the present invention, in which a continuous web of wrapping product is formed by adhering the webs of cling film 1 and spacing material 2 fed from the first and second rollers to one another and winding the web of wrapping product onto a common spool 6. The spacing of the webs of cling film 1 and spacing material 2 in FIG. 4 is exaggerated for clarity. In this embodiment of the present invention, a desired length of wrapping product 1 is severed from the main roll in much the same way as from a conventional roll of cling film 1. However, the presence of the layer of spacing material 2 (which is much less elastic than the cling film 1) prevents the combined cling film 1 and spacing material 2 from stretching as a user pulls the free end away from the main roll. Consequently, there will be no appreciable "spring-back" effect as the desired length is severed from the main roll, and regions of the cling film 1 are far less likely to adhere to the hand of the user or to other regions of the cling film 1. In addition, the laminated wrapping product of the present invention is more dimensionally stable and easier to handle than conventional cling film.

As described above, the spacing material 2 is preferably a tissue paper, and the length of tissue paper acquired when a length of cling film 1 is extracted from the main roll may be put to immediate use or stored for later use. In a preferred embodiment, the web of cling film 1 is releasably attached to the web of spacing material 2 by, for example, spot glueing. It is also possible to incorporate lines of perforations at predetermined intervals along the web to allow the dispensing of predetermined lengths of cling film 1 attached to the spacing material 2 in a similar manner to toilet or kitchen rolls.

This embodiment does not suffer from the above described drawback of conventional rolls of cling film 1, because one turn of the cling film 1 does not adhere to the turn immediately beneath it (due to the presence of the intermediate layer of spacing material 1). In addition, the end of the roll is far easier to locate then the end of a conventional roll of cling film 1, as an opaque layer (i.e., the spacing material 2) is interposed between the transparent layers of cling film 1.

Figure 5:
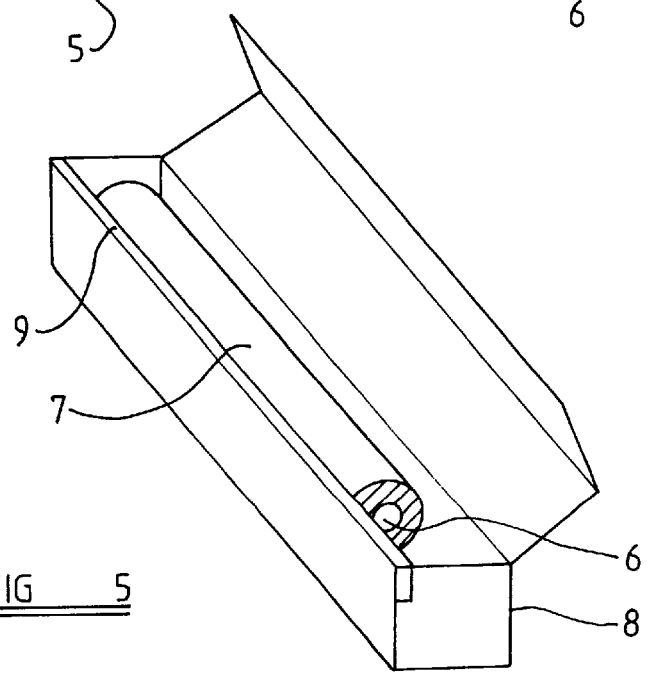
FIG. 5 shows an elongated box with a cutting edge for severing a predetermined high wrapping product embodying the present invention.

As shown in FIG. 5, a common spool 6 supports a wound composite of cling film 1 and spacer material 2 to form a roll assembly 7 packaged in an elongated, oblong box 8. If the roll assembly does not include lines of perforations, a cutting edge 9 is provided integrally with the box to assist a user in severing lengths of wrapping product from the roll.

It will be clear that embodiments of the present invention provide a wrapping product, a block and a roll that confer numerous advantages over conventional products, being simple to use and reduce wastage. In particular the present invention allows the provision of a block of sheets of cling film stacked on top of one another, without adhering to one another which has not previously been possible. This embodiment is particularly suitable for people who are only able to use one hand.

In the present specification "comprises" means "includes or consists of" and "comprising" means "including or consisting of."

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A wrapping product, said product consisting of a block of stacked sheets consisting of layers of cling film sheets for forming a wrapping product; and a layer of spacing material separating each sheet of said cling film sheets, said layers of cling film sheets and layer of spacing material being a laminate and substantially non-adherent to one another.

2. A wrapping product according to claim 1 wherein the cling film is formed from polyethylene or polyvinyl chloride.

3. A wrapping product according to claim 1 wherein the spacing material is a paper material.

4. A wrapping product according to claim 3 wherein the paper material is single-ply tissue paper.

5. A wrapping product according to claim 1 wherein means are provided to removably attach the layer of cling film to the layer of spacing material.

6. A wrapping product according to claim 5, wherein the layer of cling film is removably attached to the layer of spacing material by a weak adhesive between the layer of cling film and the layer of spacing material.

7. A wrapping product according to claim 5 wherein the layer of cling film is removably attached to the layer of spacing material by one or more spot-welds.

8. A wrapping product according to claim 1 wherein the layer of spacing material is wider than the layer of cling film.

9. A wrapping product according to claim 1 wherein said cling film and layer of spacing material are defined by sheets.

10. A wrapping product according to claim 9 wherein the sheet of spacing material is longer then the layer of cling film.

11. A wrapping product according to claim 1 further including a package to receive said block.

12. A wrapping product according to claim 11 wherein the package is a flexible package.

13. A wrapping product according to claim 11 wherein the package is a rigid package.

* * * * *